(12) United States Patent
Quigley

(10) Patent No.: US 9,790,800 B2
(45) Date of Patent: Oct. 17, 2017

(54) METHOD OF FORMING AN INFLATED AEROFOIL

(71) Applicant: ROLLS-ROYCE PLC, London (GB)

(72) Inventor: David Adrian Quigley, Newton-le-Willows (GB)

(73) Assignee: ROLLS-ROYCE plc, London (GB)

(*) Notice: Subject to any disclaimer, the term of this patent is extended or adjusted under 35 U.S.C. 154(b) by 296 days.

(21) Appl. No.: 14/822,163

(22) Filed: Aug. 10, 2015

(65) Prior Publication Data

US 2016/0047249 A1 Feb. 18, 2016

(30) Foreign Application Priority Data

Aug. 15, 2014 (GB) .................................. 1414497.6

(51) Int. Cl.
*F01D 5/18* (2006.01)
*F01D 9/04* (2006.01)
(Continued)

(52) U.S. Cl.
CPC ............. *F01D 5/18* (2013.01); *B21D 26/059* (2013.01); *B21D 53/78* (2013.01); *B23K 20/023* (2013.01); *B23K 20/2333* (2013.01); *B23K 20/2336* (2013.01); *F01D 9/041* (2013.01); *B23K 2203/10* (2013.01); *B23K 2203/14* (2013.01); *B23K 2203/18* (2013.01);
(Continued)

(58) Field of Classification Search
CPC ......... F01D 5/18; F01D 9/041; B23K 20/023; B23K 20/2336; B23K 20/2333; B23K 2203/18; B23K 2203/14; B23K 2203/10; B21D 26/059; B21D 53/78; B23P 15/04; F05D 2220/32; F05D 2230/236; F05D 2230/40; F05D 2230/60; F05D 2300/121
See application file for complete search history.

(56) References Cited

U.S. PATENT DOCUMENTS 5,729,901 A * 3/1998 Fowler ................. B21D 26/055
228/157
5,896,658 A * 4/1999 Calle .................... B21D 26/021
29/889.7
(Continued)

FOREIGN PATENT DOCUMENTS

EP 0549172 A1 6/1993
EP 0836899 A1 4/1998
(Continued)

OTHER PUBLICATIONS

Feb. 15, 2016 Search Report issued in European Patent Application No. 15 18 0393.
(Continued)

*Primary Examiner* — Igor Kershteyn
(74) *Attorney, Agent, or Firm* — Oliff PLC

(57) ABSTRACT

There is proposed a method of forming an inflated aerofoil (1), the method comprising the steps of: forming a layered, planar pre-form (30); providing at least one stress-relieving opening (44, 45, 46, 47) through the pre-form; hot creep forming and inflating the pre-form (30) to form an intermediate aerofoil; and subsequently removing material from the intermediate aerofoil, including at least a region containing the or each stress-relieving opening (44, 45, 46, 47), to form a finished aerofoil.

20 Claims, 4 Drawing Sheets

(51) Int. Cl.
  *B23K 20/02* (2006.01)
  *B23K 20/233* (2006.01)
  *B21D 26/059* (2011.01)
  *B21D 53/78* (2006.01)
  *B23P 15/04* (2006.01)
  *B23K 103/10* (2006.01)
  *B23K 103/14* (2006.01)
  *B23K 103/18* (2006.01)

(52) U.S. Cl.
  CPC .......... *B23P 15/04* (2013.01); *F05D 2220/32* (2013.01); *F05D 2230/236* (2013.01); *F05D 2230/40* (2013.01); *F05D 2230/60* (2013.01); *F05D 2300/121* (2013.01); *F05D 2300/133* (2013.01)

(56) References Cited

U.S. PATENT DOCUMENTS 6,242,715 B1 * 6/2001 Bichon ................. B21D 11/14
                                                     219/159
7,325,307 B2 * 2/2008 Franchet ................ B23P 15/04
                                                     228/118
8,162,202 B2 * 4/2012 Milburn ............... B21D 26/021
                                                     228/127
8,764,404 B2 * 7/2014 Barlow .................. F01D 5/147
                                                     416/229 A
2001/0022023 A1 * 9/2001 Wallis ................. B21D 26/055
                                                     29/889.72

FOREIGN PATENT DOCUMENTS

EP       2392423 A2   12/2011
GB       2304613 A    3/1997
WO       98/07547 A1  2/1998

OTHER PUBLICATIONS

Feb. 16, 2015 Search Report issued in British Patent Application No. 1414497.6.

* cited by examiner

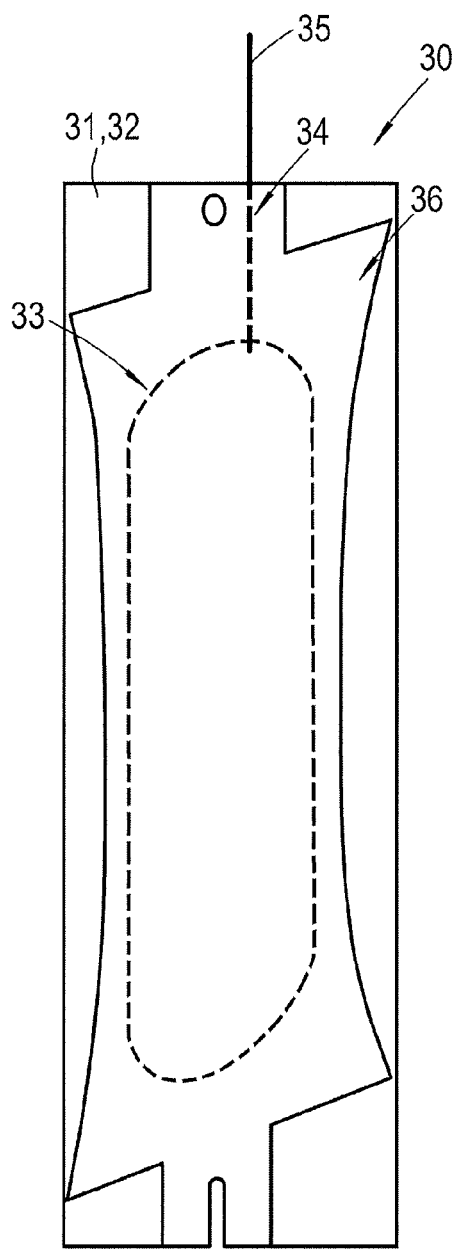
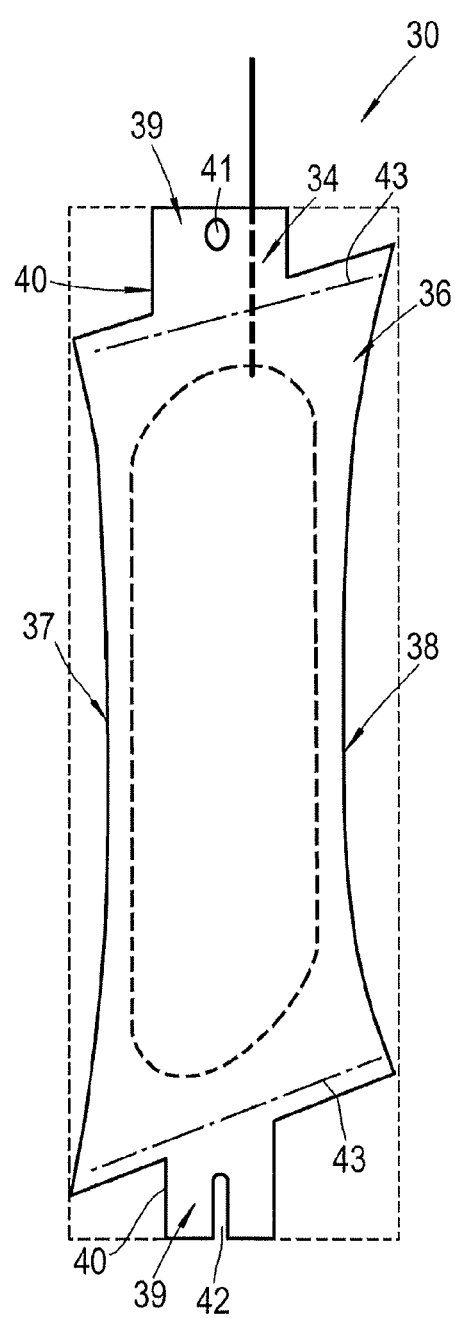

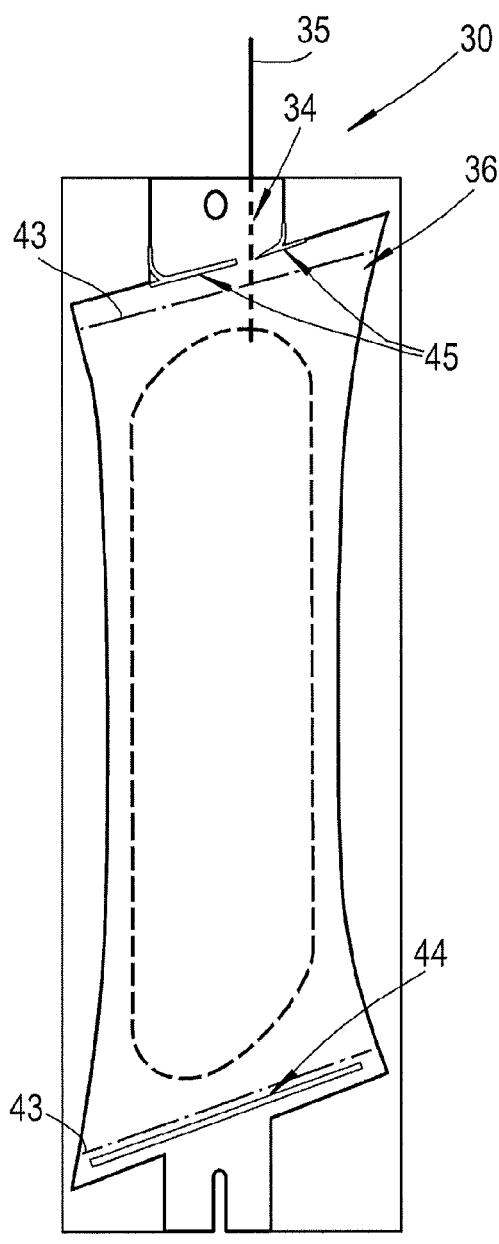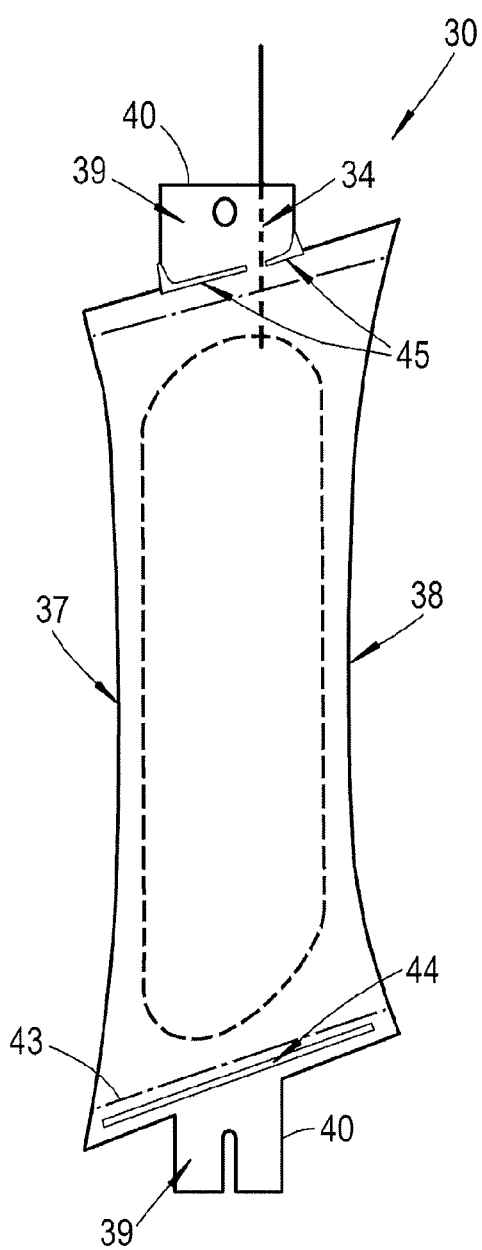

METHOD OF FORMING AN INFLATED AEROFOIL

CROSS-REFERENCE TO RELATED APPLICATIONS

This application is based upon and claims the benefit of priority from British Patent Application Number 1414497.6 filed 15 Aug. 2014, the entire contents of which are incorporated by reference.

BACKGROUND

1. Field of the Disclosure

The present disclosure relates to a method of forming an inflated aerofoil, and in preferred implementations is particularly suitable for forming an aerofoil for use as a blade or a vane in a gas turbine engine.

2. Description of the Related Art

Gas turbine engines comprise compressor and turbine arrangements having alternating stages of rotating aerofoil blades and stationary aerofoil vanes. A number of axial flow compressors are often provided which each supply high pressure air either to another downstream compressor or to a combustor. It is usual for outlet guide vanes (OGVs) to be provided aft of each compressor in order to straighten the flow from the compressor and direct it appropriately to another downstream compressor or to the combustor. The outlet guide vanes are also provided in the form of stationary aerofoils.

In order to reduce engine weight, particularly for gas turbine engines used to power aircraft, it is conventional to form these aerofoil blades and vanes so that they have a hollow configuration, and this is achieved by inflating them from planar pre-forms using a super plastic forming process which can be performed subsequent to, or simultaneously with, a hot creep forming technique to achieve the overall aerofoil shape from the planar pre-form. It is usual to cut the pre-form to define the leading and trailing edges of the aerofoil to be formed, and to create a service lug at each end of the pre-form to mount and locate the pre-form during the hot creep forming and inflation steps.

As propulsive gas turbine engines for aircraft have become larger over recent years, so have a number of the aerofoils used inside them; particularly the outlet guide vanes, and problems have been experienced in reliably and efficiently manufacturing the larger aerofoil shapes. One such problem is that of so-called "spring-back", whereby an intermediate and unfinished aerofoil created via the hot creep forming and inflation process subsequently loses its intended shape when it is cut and removed from the service lugs during finishing to prepare the final aerofoil.

FIG. 1 shows a chordal cross-section through an intermediate and unfinished aerofoil 1 following the hot creep forming and inflation process, but before the service lugs at each end of the aerofoil have been removed during a subsequent finishing process. The intermediate aerofoil is created to have a desired degree of curvature to both its concave pressure side 2 and its convex suction side 3. However, FIG. 2 shows the chordal cross-section which can result following removal of the service lugs. As will be noted, the degree of curvature present in the intermediate aerofoil has relaxed or "sprung-back" following removal of the service lugs, thereby changing the shape of the aerofoil such that it no longer conforms to its design shape.

In order to address this issue, it has previously been proposed to perform the hot creep forming process in two discrete stages. Whilst this has been effective, to a certain degree, in eliminating or reducing the likelihood of spring-back occurring, it is a very inefficient manufacturing technique which requires additional time and power when compared to a single stage process.

OBJECTS AND SUMMARY

It is an object of the present disclosure to provide an improved method of forming an aerofoil.

According to the present disclosure, there is provided a method of forming an inflated aerofoil, the method comprising the steps of: forming a layered, planar pre-form; providing at least one stress-relieving opening through the pre-form; hot creep forming and inflating the pre-form to form an intermediate aerofoil; and subsequently removing material from the intermediate aerofoil, including at least a region containing the or each stress-relieving opening, to form a finished aerofoil.

The method may include the step of providing at least one datum region on the pre-form, for use in locating the pre-form during said hot creep forming and inflating steps, wherein said step of forming said at least one stress-relieving opening involves forming the or each opening in or adjacent a said datum region, and said step of removing material from the intermediate aerofoil involves removing the or each datum region.

Conveniently, the method further includes a step of defining on the preform a nominal profile of the aerofoil to be formed.

Said step of defining a nominal profile optionally involves machining the nominal profile on at least one outwardly directed face of the pre-form.

The or at least one said stress-relieving opening may be provided through the pre-form at a position located between a said datum region and a main region of the nominal profile of the aerofoil.

Optionally, the or at least one said stress-relieving opening is provided in the form of a slot through the pre-form.

Advantageously, the or at least one said slot is located entirely within the periphery of said pre-form.

Optionally, the or at least one said slot has at least one end which is open to the periphery of the pre-form.

In some embodiments, the or at least one said slot may be elongate and substantially straight.

Optionally, the or at least one said slot may furcated.

In some embodiments, the method further comprises the step of profiling the pre-form to define a leading edge and a trailing edge for the aerofoil.

Said step of profiling can involve cutting the pre-form to define the leading edge and the trailing edge.

Said step of profiling may also, or alternatively, involve cutting the pre-form to define a peripheral edge of the or each datum region.

Conveniently, said step of providing a layered, planar preform involves bonding together a pair of outer skins. The outer skins may comprise titanium or aluminium.

Preferably, said outer skins are diffusion bonded to one another.

Optionally, the method further comprises a step of applying a stop-off material in a predefined region between the outer skins prior to said step of bonding the skins together, to thereby define an inflatable region within the pre-form.

The aerofoil may a blade or a vane for a gas turbine engine, and may preferably be an outlet guide vane for a gas turbine engine.

So that the disclosure may be more readily understood, and so that further features thereof may be appreciated, embodiments of the disclosure will now be described by way of example with reference to the accompanying drawings in which:

BRIEF DESCRIPTION OF THE DRAWINGS

FIG. 4 is a plan view of a planar pre-form as used in prior art methods for producing inflated aerofoils;

FIG. 5 is a view similar to that of FIG. 4, but which shows the pre-form having been profiled to define the leading and trailing edges for the aerofoil;

FIG. 6 is a plan view, similar to that of FIG. 4, but which shows a pre-form of a type suitable for use in the method of the present disclosure, the pre-form having stress-relieving slots formed therein;

FIG. 7 is a view similar to that of FIG. 6, but which shows the pre-form having been profiled to define the leading and trailing edges for the aerofoil;

DETAILED DESCRIPTION OF EMBODIMENTS

Figure 1:
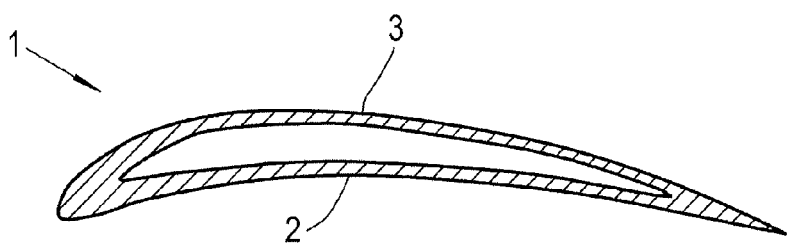
FIG. 1 (discussed above) is a chordal cross-section through an intermediate and unfinished aerofoil formed by a prior art method.
Figure 2:
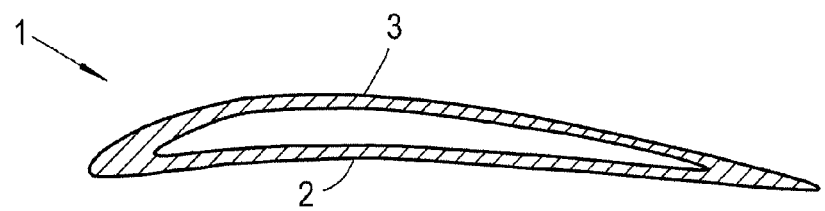
FIG. 2 (discussed above) is a view similar to that of FIG. 1, but which shows the intermediate aerofoil having lost shape during the prior art method.
Figure 3:
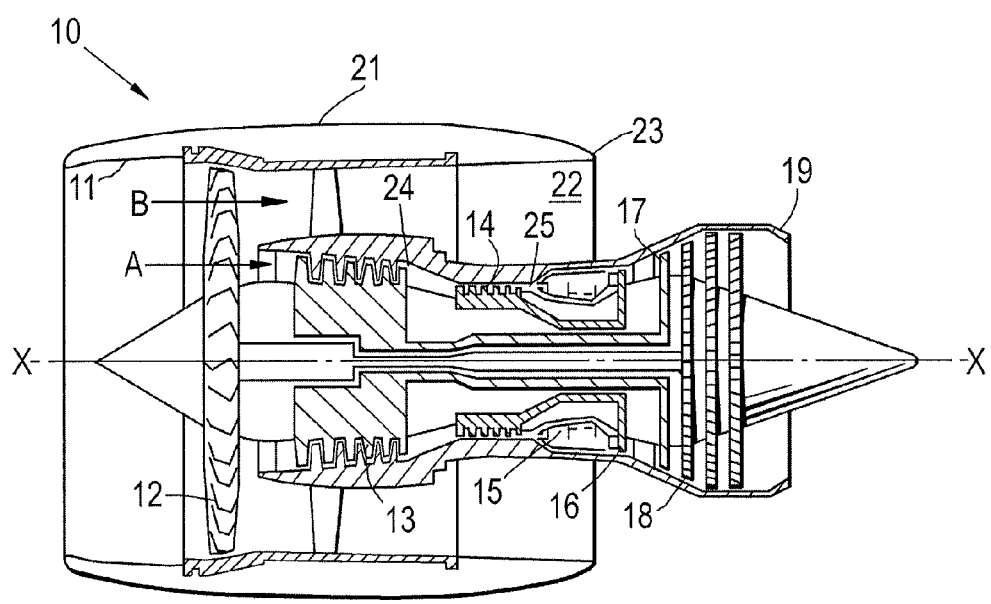
FIG. 3 is an axial cross-section through a gas turbine engine having aerofoils which may be formed by the method of the present disclosure.

Turning now to consider the drawings in more detail and with specific reference to FIG. 1, a ducted fan gas turbine engine which may incorporate aerofoils made via the method of the disclosure is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air, via a series of intermediate pressure outlet guide vanes 24, to the high pressure compressor 14 where further compression takes place.

The compressed air exhausted from the high-pressure compressor 14 is directed, via a series of high pressure outlet guide vanes 25, into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The intermediate pressure guide vanes 24 and the high pressure guide vanes 25 comprise aerofoils which may be formed by the method of the present disclosure. The fan 12, intermediate and high pressure compressors 13, 14 and the high, intermediate and low pressure turbines 16, 17, 18 also each comprise blades in the form of aerofoils which can be formed by the method of the present disclosure. However, it is envisaged that the method of the present disclosure will be particularly well suited to producing large outlet guide vanes.

The method of the present disclosure shares some steps with prior art methods for producing inflated aerofoils, and these can be understood from a consideration of FIGS. 4 and 5.

Firstly, a layered planar pre-form 30 is constructed as shown in FIG. 4. The pre-form 30 is formed from a pair of planar outer skins or sheets 31, 32 which are superimposed on one another as shown. In the pre-form of FIG. 4 the outer sheets 31, 32 are shown to be of generally rectangular configuration, having a length which is somewhat longer than the length of the aerofoil which is to be produced. The sheets 31, 32 may be formed of any suitable material, although it is envisaged that the sheets 31, 32 will be formed from titanium or aluminium. In preferred arrangements, the two sheets 31, 32 each have a thickness of approximately 6 millimetres.

A stop-off material such as yttria, boron nitride, graphite or alumina is applied to the inside surfaces of the two sheets 31, 32, over a predefined region 33. The superimposed sheets 31, 32 are then diffusion bonded by applying heat and pressure, which is thus effective to bond the two sheets 31, 32 to one another except in the region 33 where the stop-off material is applied. The resulting pre-form 30 thus has a thickness of approximately 12 mm, and has a centrally located void defined by the region 33 over which the stop-off material was applied.

An inflation channel 34 is provided in the pre-form, the channel 34 extending from a peripheral end edge of the pre-form to the void defined by the region 33. The channel 34 may be fluidly connected to an inflation pipe 35 as shown.

A nominal profile 36 of the aerofoil to be produced is then defined on the pre-form. The profile 36 may be defined by machining the oppositely and outwardly directed surfaces of the pre-form 30 so as to sculpt them and reduce the thickness of the pre-form across the area of the nominal profile 36.

The pre-from 30 is then profiled further by cutting the pre-form to define a leading edge 37 and a trailing edge 38 of the aerofoil. This profile cutting may be achieved by the use of a very high pressure water-jet cutting technique, although it is to be appreciated that other cutting techniques known in the art can be used instead. It is to be noted that as the leading and trailing edges 37, 38 are cut through the pre-form, a datum region or service lug 39 is defined at each end of the nominal aerofoil profile. More particularly, a peripheral edge 40 of each respective datum region is cut from the pre-form in the same manner as the leading and trailing edges 37, 38. In the profiled pre-form 30 illustrated in FIG. 5, each datum region 39 is generally rectangular in form and extends outwardly from a respective straight end edge of the nominal aerofoil profile 36.

It is to be appreciated that the datum regions 39 will usually have a thickness approximately equal to the combined thicknesses of the two constituent sheets 31, 32. In other words, whilst the creation of the nominal profile 36 will involve reducing the thickness of the pre-form over the area of the nominal profile, the datum regions will not have their thicknesses reduced in the same manner. Datum holes 41 and/or datum recesses 42 or similar features are provided in the datum regions 39.

The resulting pre-form 30, as shown in FIG. 5, is then hot creep formed in order to deform it into the curved shape of an aerofoil, and is also inflated in a super-elastic forming step, by injecting a suitable inert gas such as argon into the void inside the pre-form via the inflation pipe 35 and the inflation channel 34. An intermediate, unfinished aerofoil is thus produced.

As will be appreciated by those of skill in the art, the datum regions 39 and their associated datum holes 41 and/or recesses 42 are used to mount and accurately locate the pre-form during the hot creep and super-elastic inflation steps. It is to be appreciated that the hot creep forming and super-elastic inflation can be performed as distinct steps (for example in different dies) or substantially simultaneously and/or successively in the same die.

The resulting intermediate aerofoil is then further processed by removing excess material to create the finished aerofoil product. With reference to FIG. 5, the intermediate aerofoil is specifically finished by removing the datum regions 39 at each end. In this regard, the end regions of the intermediate aerofoil are removed up to the respective reference lines 43. The above-mentioned problem of springback, discussed in the introductory section, arises from this removal of the datum regions 39 and the adjacent regions of material from the intermediate aerofoil.

The method of the present disclosure addresses this problem by providing at least one stress-relieving opening through the pre-form in a region of the pre-form which will be removed from the intermediate aerofoil during the finishing process. An embodiment of the proposal is illustrated schematically in FIGS. 6 and 7.

The pre-form 30 is, in the most part, prepared in the same manner as described above, and is as shown in FIG. 6. However, it will be noted that at each end of the pre-form 30, in regions outside the main region of the nominal profile 36 having the most significantly reduced thickness and beyond the reference lines 43, stress-relieving openings 44, 45 are provided, which extend completely through the thickness of the pre-form 30.

In the pre-form 30 illustrated in FIG. 6, the stress-relieving opening 44 provided at the bottom end (in the orientation illustrated) is provided in the form of an elongate and straight slot which extends generally parallel to the adjacent reference line 43. The slot 44 is thus located generally adjacent the datum region 39 when its peripheral edge 40 is cut from the pre-form, as illustrated in FIG. 7, and is thus positioned between the datum region 39 and the main region of the nominal profile 36 of the aerofoil. The slot 44 is located entirely within the periphery of the pre-form 30, as illustrated in FIG. 7, and thus has two closed ends, each of which is located generally adjacent a respective one of the leading edge 37 and the trailing edge 38.

Although it is envisaged that the stress-relieving openings provided at each end of the pre-form may be of substantially identical form, it is also possible for them to have different configurations. By way of example, it will be noted that the upper end (in the orientation illustrated) of the pre-form illustrated in FIGS. 6 and 7 is actually provided with a pair of openings in the form of bifurcated slots 45. Each bifurcated slot 45 is located on a respective side of the inflation channel 34, and has one limb which curls around the corner of the datum region, and a second limb which is positioned to substantially coincide with the end edge of the nominal profile 36 of the aerofoil. As will be noted from FIG. 7, when the pre-form is then profile cut, to define the leading and trailing edges 37, 38 and the peripheral edges 40 of the datum regions, the two bifurcated slots 45 effectively become open through the peripheral edge of the pre-form 30.

It has been found that by providing stress relieving openings, such as the slots 44, 45 described above, through the relatively thick end regions of the pre-form, either adjacent or in the datum regions, sufficient stress is relieved in the pre-form as it is hot creep formed and inflated, to prevent spring-back occurring when the datum regions 39 are subsequently removed from the resulting intermediate aerofoil during the finishing process.

It will be noted, having particular regard to FIG. 7, that when the intermediate aerofoil is finished by removing the datum regions 39, that because the stress-relieving slots 44, 45 are provided on the opposite side of the reference lines 43 to the main region of the aerofoil, that the material in which the slots 44, 45 are provided will be removed during the final finishing steps, thereby removing any trace of the slots in the final aerofoil product.

Figure 8:
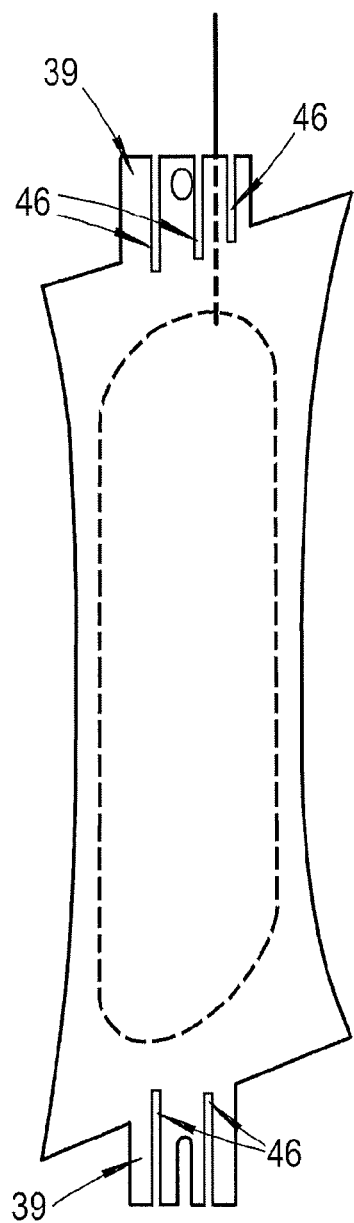
FIG. 8 is a view similar to that of FIG. 7, but which shows alternative configurations of stress-relieving slots.

It is to be appreciated that various configurations and orientations for the stress-relieving openings may be possible. For example, FIG. 8 illustrates a pre-form 30 following the profile cutting of the leading and trailing edges 37, 38 and the peripheral edges 40 of the datum regions 39 in which a plurality of parallel stress-relieving slots 46 are provided in each datum region 39. In this arrangement, each slot 46 is open to the periphery of the pre-form.

Figure 9:
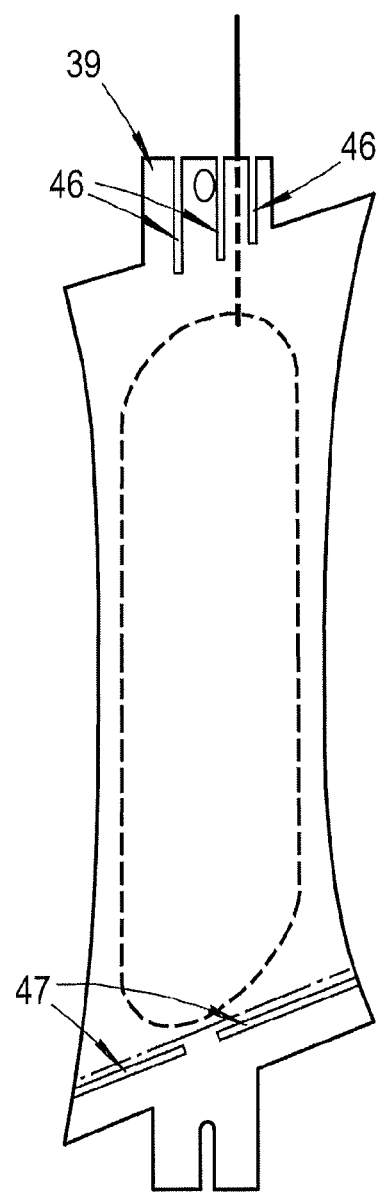
FIG. 9 is another view similar to that of FIG. 7, showing further alternative configurations of stress-relieving slots.

FIG. 9 illustrates further configurations for the stress-relieving openings. At the bottom end (in the orientation illustrated), there are provided a pair of collinear slots 47, each of which is open to the periphery of the pre-form 30 at one end.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

I claim:

1. A method of forming an inflated aerofoil, the method comprising the steps of: forming a layered, planar pre-form; providing at least one stress-relieving opening through the pre-form; hot creep forming and inflating the pre-form to form an intermediate aerofoil; and subsequently removing material from the intermediate aerofoil, including at least a region containing the or each stress-relieving opening, to form a finished aerofoil.

2. A method according to claim 1, further including the step of providing at least one datum region on the pre-form, for use in locating the pre-form during said hot creep forming and inflating steps, wherein said step of forming said at least one stress-relieving opening involves forming the or each opening in or adjacent a said datum region, and said step of removing material from the intermediate aerofoil involves removing the or each datum region.

3. A method according to claim 1, further including a step of defining on the pre-form a nominal profile of the aerofoil to be formed.

4. A method according to claim 3, wherein said step of defining a nominal profile involves machining the nominal profile on at least one outwardly directed face of the pre-form.

5. A method according to claim 2, further including a step of defining on the pre-form a nominal profile of the aerofoil to be formed, wherein the or at least one said stress-relieving opening is provided through the pre-form at a position located between a said datum region and a main region of the nominal profile of the aerofoil.

6. A method according to claim 1, wherein the or at least one said stress-relieving opening is provided in the form of a slot through the pre-form.

7. A method according to claim 6, wherein the or at least one said slot is located entirely within the periphery of said pre-form.

8. A method according to claim 6, wherein the or at least one said slot has at least one end which is open to the periphery of the pre-form.

9. A method according to claim 6, wherein the or at least one said slot is elongate and substantially straight.

10. A method according to claim 6, wherein the or at least one said slot is furcated.

11. A method according to claim 1, further comprising a step of profiling the pre-form to define a leading edge and a trailing edge for the aerofoil.

12. A method according to claim 11, wherein said step of profiling involves cutting the pre-form to define the leading edge and the trailing edge.

13. A method according to claim 2, further comprising a step of profiling the pre-form to define a leading edge and a trailing edge for the aerofoil, wherein said step of profiling involves cutting the pre-form to define a peripheral edge of the or each datum region.

14. A method according to claim 1, wherein said step of providing a layered, planar preform involves bonding together a pair of outer skins.

15. A method according to claim 14, wherein said outer skins comprise titanium or aluminium.

16. A method according to claim 14, wherein said outer skins are diffusion bonded to one another.

17. A method according to claim 14, further comprising a step of applying a stop-off material in a predefined region between the outer skins prior to said step of bonding the skins together, to thereby define an inflatable region within the pre-form.

18. A method according to claim 1, wherein the aerofoil is a blade or a vane for a gas turbine engine.

19. A method according to claim 1, wherein the aerofoil is an outlet guide vane for a gas turbine engine.

20. A gas turbine engine comprising a blade or vane formed using the method of claim 1.

* * * * *